United States Patent
Thomas

(10) Patent No.: US 8,832,182 B2
(45) Date of Patent: Sep. 9, 2014

(54) SYSTEM AND METHOD FOR PROVIDING A UNIVERSAL ELECTRONIC WALLET

(75) Inventor: David Thomas, North York (CA)

(73) Assignee: Omnego Inc., Toronto (CA)

( * ) Notice: Subject to any disclaimer, the term of this patent is extended or adjusted under 35 U.S.C. 154(b) by 335 days.

(21) Appl. No.: 13/121,344

(22) PCT Filed: Mar. 26, 2009

(86) PCT No.: PCT/CA2009/000383
§ 371 (c)(1),
(2), (4) Date: Mar. 28, 2011

(87) PCT Pub. No.: WO2010/037204
PCT Pub. Date: Apr. 8, 2010

(65) Prior Publication Data
US 2011/0179113 A1   Jul. 21, 2011

Related U.S. Application Data

(60) Provisional application No. 61/102,587, filed on Oct. 3, 2008.

(51) Int. Cl.
| | | |
|---|---|---|
| G06F 17/30 | (2006.01) | |
| G07F 7/10 | (2006.01) | |
| G06Q 20/34 | (2012.01) | |
| G06Q 20/06 | (2012.01) | |
| G06Q 20/36 | (2012.01) | |
| H04W 8/20 | (2009.01) | |
| H04W 8/18 | (2009.01) | |

(52) U.S. Cl.
CPC ............ *G07F 7/1008* (2013.01); *G06Q 20/363* (2013.01); *G06Q 20/3572* (2013.01); *G06Q 20/3574* (2013.01); *G06Q 20/0655* (2013.01); *H04W 8/18* (2013.01)
USPC .......................................... 709/203; 709/219

(58) Field of Classification Search
None
See application file for complete search history.

(56) References Cited

U.S. PATENT DOCUMENTS

| | | |
|---|---|---|
| 7,240,036 B1 | 7/2007 | Mamdani et al. |
| 7,493,284 B2 | 2/2009 | Celi, Jr. et al. |
| 7,523,067 B1 | 4/2009 | Nakajima |
| 2001/0051915 A1 | 12/2001 | Ueno et al. |
| 2002/0023027 A1 | 2/2002 | Simonds |
| 2002/0179704 A1 | 12/2002 | Deaton |

(Continued)

FOREIGN PATENT DOCUMENTS

| | | |
|---|---|---|
| CA | 2621358 | 3/2007 |
| CA | 2647636 | 3/2008 |

(Continued)

OTHER PUBLICATIONS

International Search Report, Jul. 14, 2009.

(Continued)

*Primary Examiner* — Andrew Chriss
*Assistant Examiner* — Joshua A Kading
(74) *Attorney, Agent, or Firm* — Perry + Currier Inc.

(57) ABSTRACT

A system and method for providing a universal electronic wallet is provided. In one embodiment portable electronic devices are deployed having a universal wallet application and a wallet data file associated with the application. The wallet data file is configured to maintain a plurality of different types of wallet artifacts in the form of data records, according to unique uniform resource identifiers respective to each artifact type.

15 Claims, 10 Drawing Sheets

(56) References Cited

U.S. PATENT DOCUMENTS

| | | |
|---|---|---|
| 2003/0058261 A1 | 3/2003 | Challa et al. |
| 2004/0176105 A1* | 9/2004 | Ashmore et al. ........... 455/456.3 |
| 2006/0165060 A1* | 7/2006 | Dua .............................. 370/352 |
| 2007/0067267 A1 | 3/2007 | Ives |
| 2008/0059300 A1 | 3/2008 | Hamoui |
| 2008/0097851 A1 | 4/2008 | Bemmel et al. |
| 2008/0228567 A1 | 9/2008 | Williams et al. |
| 2009/0089166 A1 | 4/2009 | Happonen |
| 2009/0125387 A1* | 5/2009 | Mak et al. ....................... 705/14 |
| 2009/0138366 A1 | 5/2009 | Bemmel et al. |
| 2009/0164605 A1 | 6/2009 | Lusher et al. |
| 2010/0046443 A1* | 2/2010 | Jia et al. ........................ 370/329 |
| 2010/0287247 A1* | 11/2010 | Kohring et al. .............. 709/206 |
| 2012/0116959 A1* | 5/2012 | Pitroda et al. .................. 705/39 |

FOREIGN PATENT DOCUMENTS

| | | |
|---|---|---|
| CA | 2674819 | 7/2008 |
| WO | 00/41121 A1 | 7/2000 |
| WO | 2008/030358 A2 | 3/2008 |

OTHER PUBLICATIONS

Related PCT International Application No. PCT/CA2010/000517 International Search Report dated Jan. 5, 2011.
Related PCT International Application No. PCT/CA2010/000517 Written Opinion dated Jan. 5, 2011.
Related PCT International Application No. PCT/CA2010/000912 International Search Report dated Feb. 17, 2011.
Related PCT International Application No. PCT/CA2010/000912 Written Opinion dated Feb. 17, 2011.

* cited by examiner

SYSTEM AND METHOD FOR PROVIDING A UNIVERSAL ELECTRONIC WALLET

FIELD

The present specification relates generally to computing and more specifically relates to a system and method for providing a universal electronic wallet.

BACKGROUND

The use of the technical features of electronic devices to replace other technologies is, of course, only increasing. Word processing software has replaced typewriters; packet switched telephony is replacing circuit switched telephony; electronic trading is replacing the traditional stock exchange; banking is also increasingly being handled by electronic transfer of funds in place of paper money or bills of exchange. But there is much more to be done.

The concept of electronic wallets to replace physical wallets is known. For example, it is known to have an electronic wallet that maintains credit card information. One problem with existing electronic wallet technologies is that each wallet application tends to lack flexibility and therefore be of limited use in supplanting the use of physical wallets.

DESCRIPTION

Figure 1:
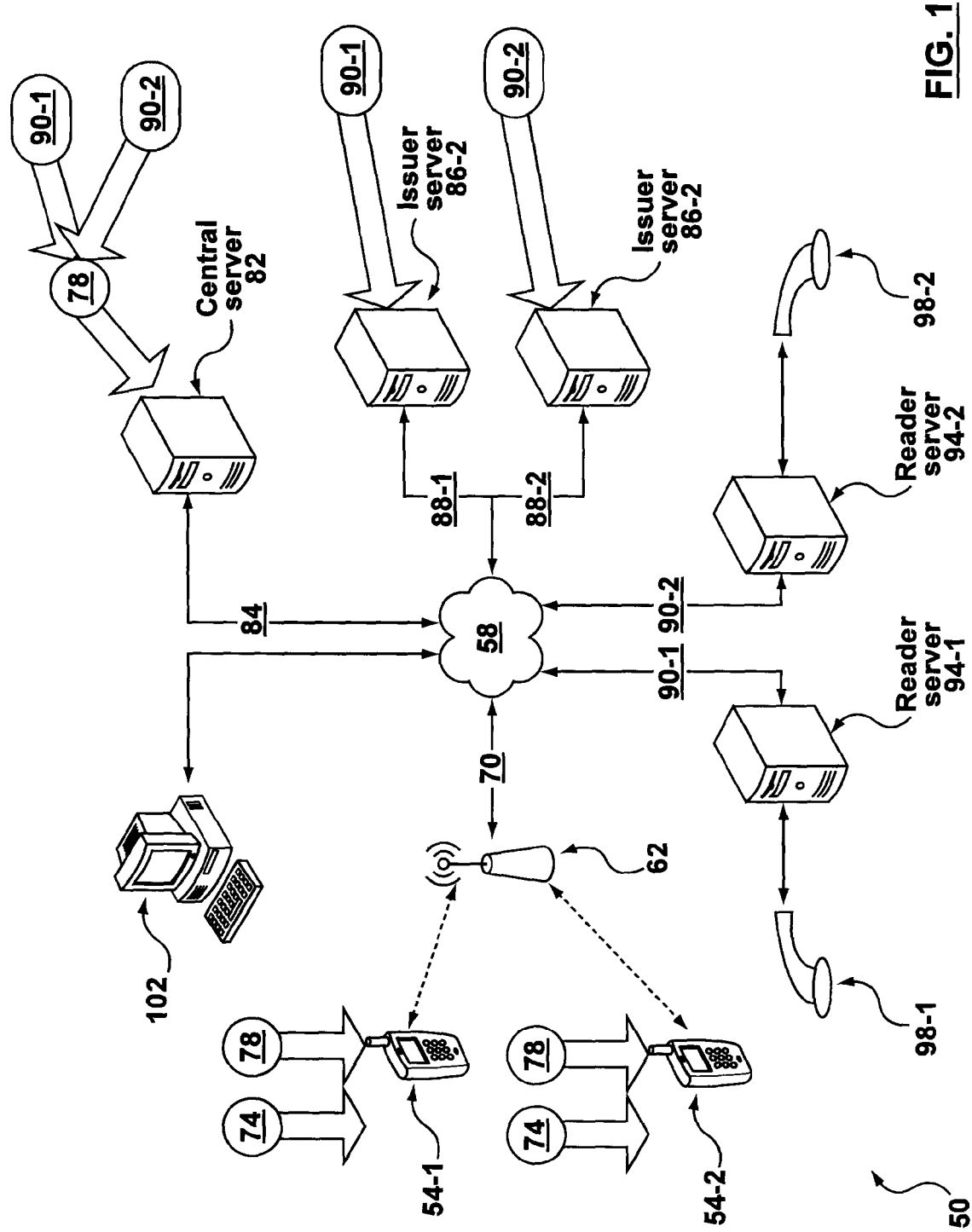
FIG. 1 shows a system for providing a universal electronic wallet for portable computing devices.

Referring now to FIG. 1, a system for providing a universal electronic wallet for portable computing devices is indicated generally at 50. In a present embodiment system 50 comprises a plurality of portable computing devices 54-1, 54-2 (generically, computing device 54, and collectively, computing devices 54) connected to a network 58 via a wireless base station 62. In turn, wireless base station 62 connects to portable computing device 54 via a wireless link 66 and to network 58 via a backhaul 70.

Network 58 can comprise the Internet, or can comprise any other wide area network such as the public switched telephone network (PSTN), or can comprise combinations of various network topographies.

Base station 62 can be based on one or more architectures including, without limitation, Global System for Mobile communications (GSM), General Packet Radio Service (GPRS), Enhanced Data Rates for GSM Evolution (EDGE), 3G, 4G, Universal Mobile Telecommunications System (UMTS), Institute of Electrical and Electronics Engineers (IEEE) Standard 802.11, IEEE 802.15, Bluetooth. Link 66 therefore corresponds to the architecture of base station 62, and thus portable computing device 54 includes a radio (shown below) so that it is configured to communicate via link 66. Portable computing device 54 can be configured to have multiple radios so that it can communicate over different architectures.

As will be discussed in greater detail below, portable computing device 54 is configured to maintain a universal wallet application 74 and a universal wallet data file 78.

System 50 also comprises a central server 82 which connects to network 58 via a backhaul link 84. As will be discussed in greater detail below, central server 82 and is configured to create, update, delete and otherwise maintain universal wallet data file 78, as will be discussed in greater detail below.

System 50 also comprises a plurality of issuer servers 86-1, 86-2 (generically, issuer server 86 and collectively, issuer servers 86), which are connected to network 58 via backhauls 88-1 and 88-2. As will be discussed in greater detail below, each issuer server 86 is configured to create, update, delete and otherwise maintain individual records 90-1, 90-2, 90-3, 90-4, 90-5, 90-6, 90-7, 90-8, 90-9, and 90-10 (generally referred to as record 90, and collectively as records 90) which are aggregated into data file 78 by central server 82.

System 50 also comprises a plurality of reader servers 94-1, 94-2 (generally referred to as record 94, and collectively as records 94 which are connected to network 58 via backhauls 96. Each reader server 94 94-1 and 94-2 include a proximity reader 98-1 and 98-2 (generally referred to as reader 98, and collectively as readers 98), respectively which is an input device that is configured to read output generated by device 54 when device 54 is positioned proximal to one of the readers 98. In a present embodiment, each proximity reader 98 is a barcode scanner, but other types of proximity readers are contemplated as discussed further below.

Figure 2:
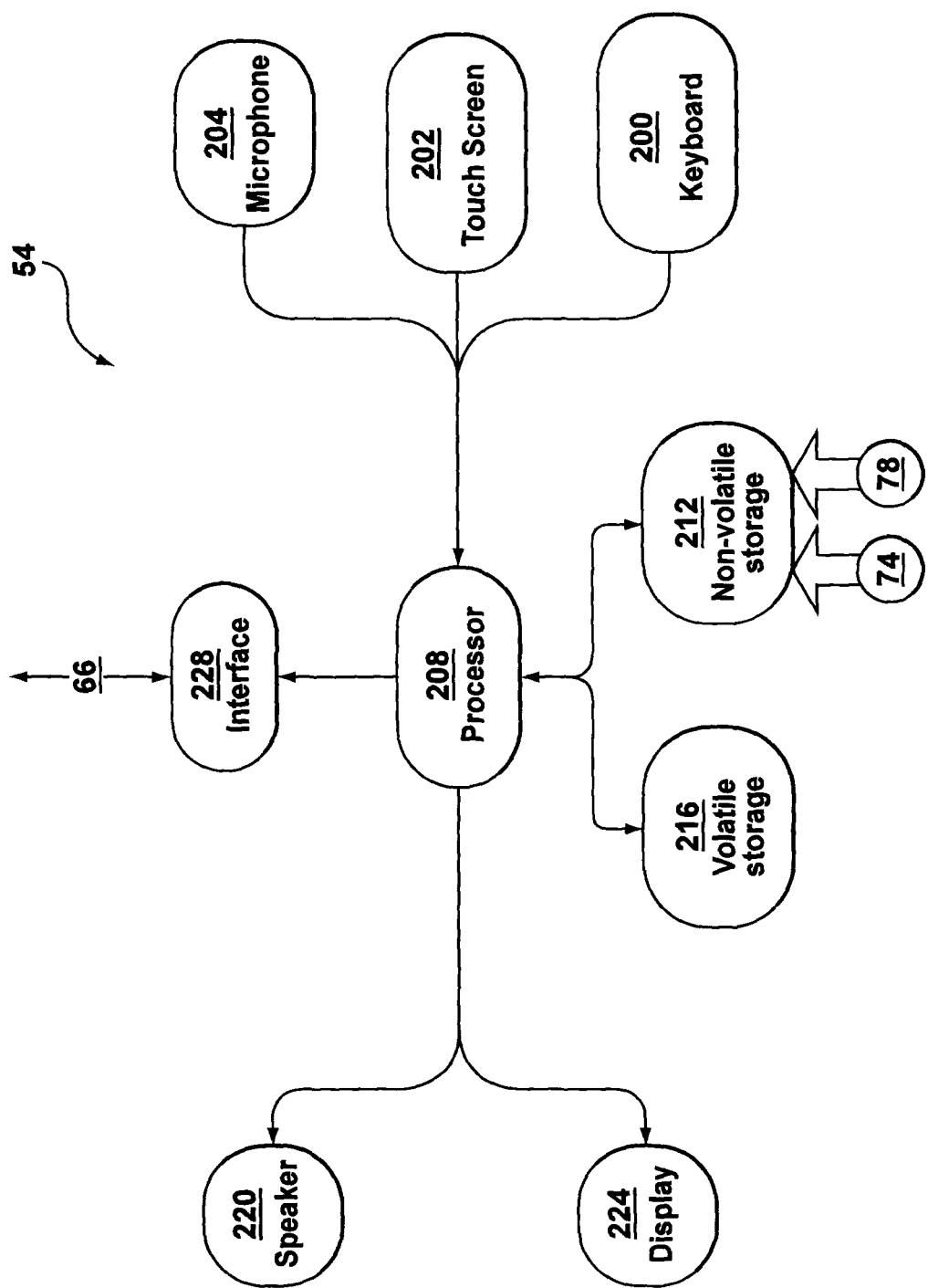
FIG. 2 shows a schematic representation of the portable computing device of FIG. 1.

Referring briefly now to FIG. 2, each computing device 54 can be any type of electronic device that can be used in a self-contained manner and to interact with over network 58. Interaction includes displaying of information on computing device 54 as well as to receive input at computing device 54 that can in turn be sent back over network 58. It should be emphasized that the structure in FIG. 2 is purely exemplary, and contemplates a device that can be used for both wireless voice (e.g. telephony) and wireless data (e.g. email, web browsing, text) communications. In a present embodiment, computing device 54 is a mobile electronic device with the combined functionality of a personal digital assistant, a cell phone, and an email paging device. Many well known cellular telephone models, or variants thereof, are suitable for the present embodiment.

Device 54 thus includes a plurality of input devices which in a present embodiment include a keyboard 200, a touch screen 202, and a microphone 204. Touch screen 202 can be implemented as another form of pointing device such as a trackwheel or trackball or the like. Input from keyboard 200, touch screen 202 and microphone 204 is received at a processor 208. Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 54 as described herein are typically maintained, persistently, in non-volatile storage unit 212 and used by processor 208 which makes appropriate utilization of volatile storage 216 during the execution of such programming instructions. Those skilled in the art will now recognize that non-volatile storage unit 212 and volatile storage 216 are examples of computer readable media that can store programming instructions executable on processor 208.

Processor 208 in turn is also configured to control a speaker 220 and a display 224. Processor 208 also connects to a network interface 228, which are implemented in a present embodiment as radios configured to communicate over link 66. In general, it will be understood that interface 228 is configured to correspond with the network architecture that is used to implement link 66. (In other embodiments a plurality of links 66 with different protocols can be employed and thus a plurality of interfaces can be provided to support each link.) It should be understood that in general a wide variety of configurations for device 54 are contemplated.

In a present embodiment, device 54 is also configured to maintain a universal wallet application 74 and a universal wallet data file 78. Universal wallet application 74 is maintained within non-volatile storage 212. Processor 208 is configured to execute universal wallet application 74, such that when universal wallet application 74 is loaded on processor 208, various transistors and other components in processor 208 are arranged in a particular way so that device 54 is, at least temporarily, a uniquely configured piece of hardware that performs the functions of universal wallet application 74. During such time, device 54 is configured to receive input from keyboard 200 relative to universal wallet application 74, and to generate graphical interfaces on display 224. Processor 208 is further configured to access universal wallet data file 78 on behalf of universal wallet application 74, as will be discussed further below.

Referring again to FIG. 1, servers 82, 86 and 94 can be based on any well-known server environment including a module that houses one or more central processing units, volatile memory (e.g. random access memory), persistent memory (e.g. hard disk devices) and network interfaces to allow those servers to communicate over relevant links. For example, servers 82, 86, or 94 or all of them can be a Sun Fire V480 running a UNIX operating system, from a company such as SUN MICROSYSTEMS, INC. of Palo Alto Calif., and having four central processing units each operating at about nine-hundred megahertz and having about sixteen gigabytes of random access memory. However, it is to be emphasized that this particular server is merely exemplary, and a vast array of other types of computing environments for servers 82, 86, or 94 are contemplated. Those skilled in the art will now recognize that non-volatile storage and volatile storage are examples of computer readable media that can store programming instructions executable on the processors of each server.

System 50 also comprises a desktop computing device 102. Computing device 102 is configured to execute a web browser. Computing device 102 can be based on any known desktop or laptop computing environment including a module that houses one or more central processing units, volatile memory (e.g. random access memory), persistent memory (e.g. hard disk devices) and network interfaces to allow computing device 102 to communicate, directly or indirectly, over network 58. A variety of computing environments for computing device 102 are contemplated. Those skilled in the art will now recognize that non-volatile storage and volatile storage are examples of computer readable media that can store programming instructions executable on the processor of computing device 102. Computing device 102 in a present embodiment is configured to execute a web browser that can be used to administer universal wallet data file 78.

In a present embodiment, system 50 utilizes novel custom uniform resource identifiers ("URI") schemes to pass various forms of data, and/or references to that data, respective to each record 90. Universal wallet application 74 identifies and registers custom URI schemes for each record 90 that conform to the Internet standard described in public RFC 3986— "Uniform Resource Identifier (URI): Generic Syntax"("URI Standard").

Each type of record 90 that wallet application 74 handles is identified by a custom URI scheme. In accordance with the URI Standard, wallet application 74 defines each scheme identifier as well as each constituent component of the URI— the "authority", "path", "query", and "fragment" components. The nature and contents of this latter set of components varies depending upon the specific attributes of the particular type of record 90 that is being described.

Operationally, when one of the URIs associated with a record 90 is encountered during routine user interaction with applications on the mobile device, wallet application 74 is launched and passed the custom URI data associated with a record 90. Such an event triggers the appropriate business process execution within the application 74, based on the specific scheme and data components described in the incoming URI.

A present embodiment comprises a set of custom URIs using the approach outlined above, however further new URIs to this list over time to support other types of records 90. Table I provides such an exemplary list of custom URI schemes:

TABLE I

| URI Scheme Definition | Type of Record 90 |
| --- | --- |
| "Bizcard://" | A virtual business card or contact data |
| "VanityCard://" | A user-created representation of a plastic or paper ID card |
| "LoyaltyCard://" | A store-issued customer card |
| "IDCard://" | A card used mainly for identification purposes, such as a student ID |
| "SVCard://" | A representation of a stored value card (i.e. gift or prepaid card) |
| "RetailCoupon://" | A coupon issued by a retailer or store |
| "MfgCoupon://" | A coupon issued by a product manufacturer |
| "EventBadge://" | A credential issued to permit access to an event |
| "Receipt://" | A digital representation of a sale receipt |
| "EventTicket://" | A ticket to a short-duration event such as a concert or game |
| "SubscriberPass://" | A recurring, longer duration pass such as for public transit systems |
| "Calendar://" | A virtual calendar appointment or event |

Figure 3:
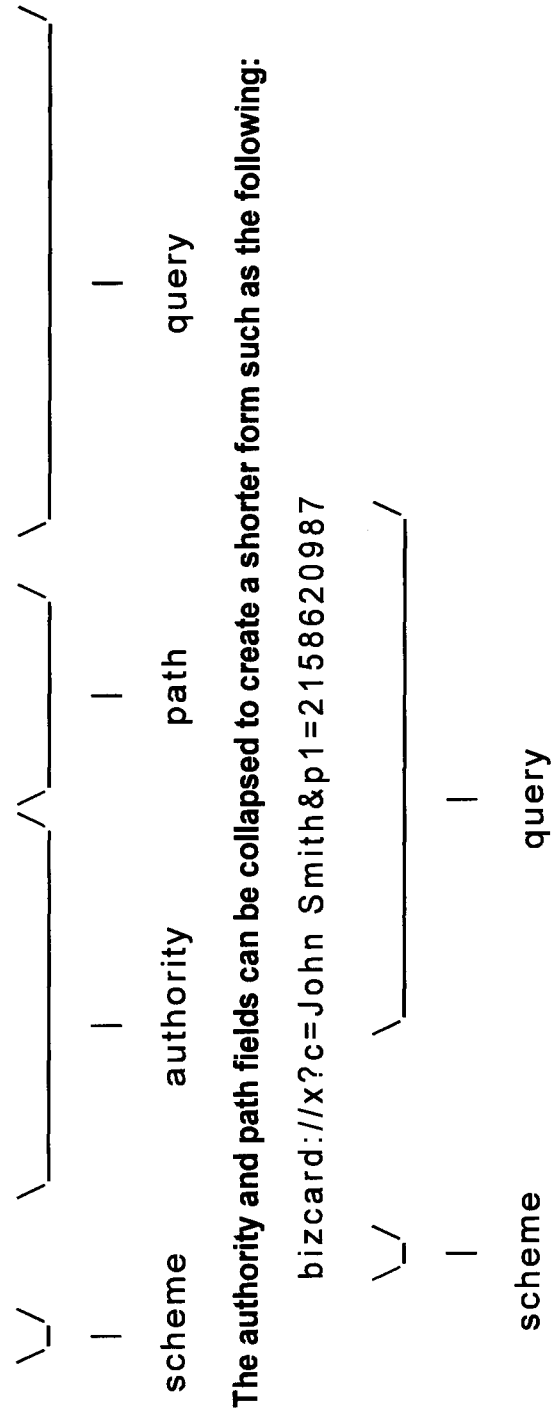
FIG. 3 shows exemplary syntax for a business card uniform resource identifier.

FIG. 3 shows an exemplary structure for the "Bizcard://" URI Scheme Definition. As the example in FIG. 3 shows, the various fields that make up the business card contents are encoded within the query string of the URI. Note that several of the fields are optional and can be left out if desired. In addition, more fields may be added to the definition in the future as needs dictate. Table II summarizes exemplary field identifiers that can be supported for the "Bizcard://" URI Scheme.

TABLE II

Exemplary Bizcard URI Scheme Fields

| Field | Prefix |
|---|---|
| Full name or composite name | c= |
| First name | f= |
| Last name | l= |
| Organization | o= |
| Title | j= |
| Email address | e= |
| Street address 1 | r1= |
| Street address 2 | r2= |
| City | t= |
| State/province | s= |
| Postal code | z= |
| County | y= |
| URL | u= |
| Phone 1 | p1= |
| Phone 2 | p2= |
| Note | n= |

Using Table II, an exemplary business card URI can appear as follows (ignoring the carriage returns resulting of page width restrictions):

"bizcard://v?c=John R. Smith&f=John&l=Smith&o=Tyco Toys Inc.&j=President and CEO&e=john.smith@tyco.com&r1=123 Main St.&r2=Suite 101&t=Newtown&s=PA&z=18935&y=USA&u=www.tyco.com&p1=2158452340&p2=2 673439087&n=We are tops in toys". Those skilled in the art will now appreciate that the other URI schemes from Table I can be constructed in a like fashion.

Figure 4:
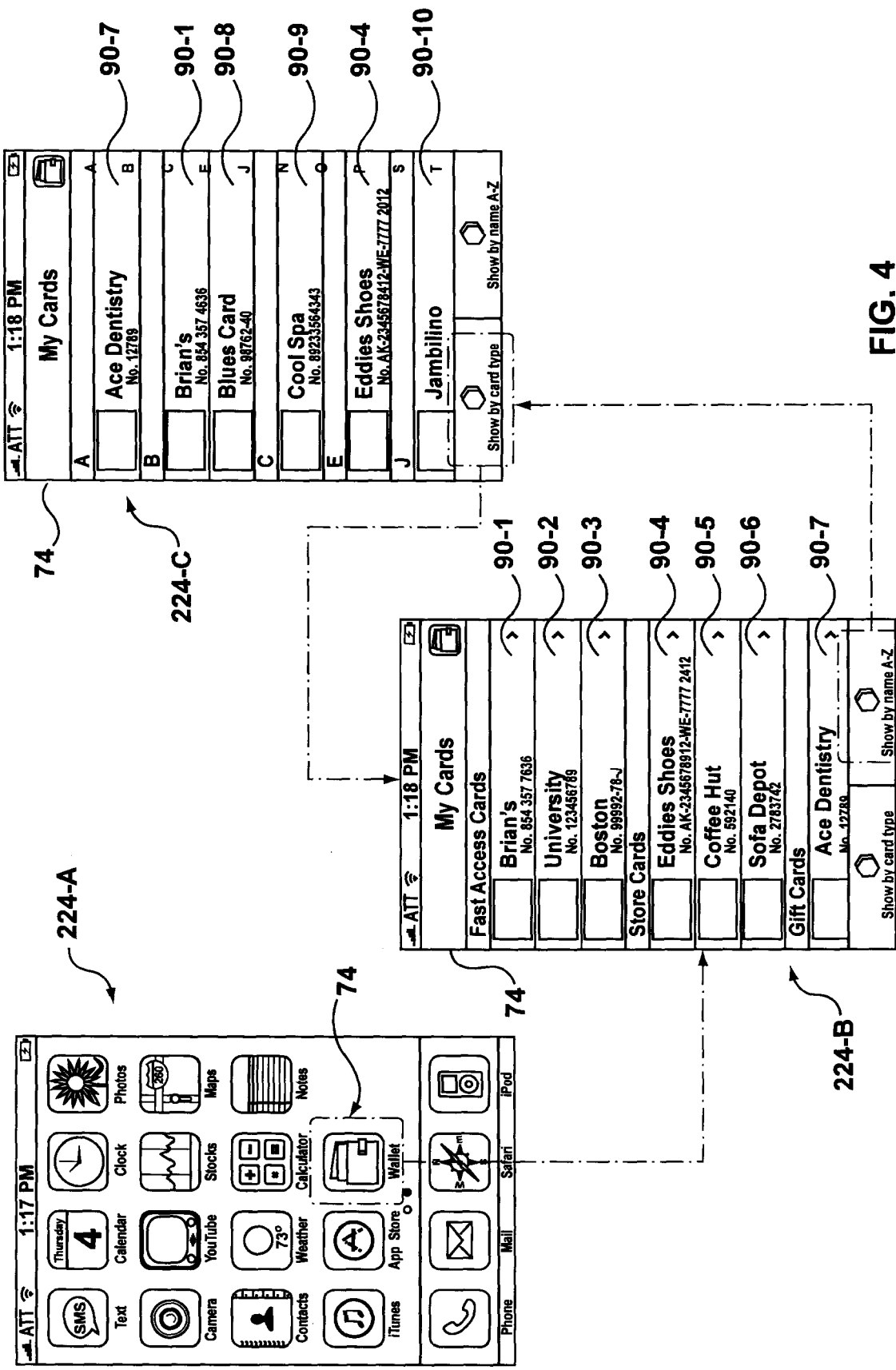
FIG. 4 shows exemplary screen shots from the electronic device of FIG. 1.

Referring now to FIG. 4, exemplary screen shots from display 224 of device 54 are provided showing certain exemplary invocation and performance of application 74. The first screen shot, marked as display 224-A shows the main menu of a plurality of applications which can be executed on device 54, including wallet application 54. Upon depressing touchscreen 202 in the area of display 224-A corresponding to the icon for application 74, application 74 will be loaded onto processor 208 and executed thereby. Upon loading and execution of application 74 onto processor 208, the screen shot marked as display 224-B on FIG. 4 shows a screen labeled "My Cards" which includes a plurality of virtual cards of various types, each of those cards representing a different data record 90. On display 224-B, cards are sorted by type. Depressing touchscreen 202 in the area of display 224-B indicated will invoke display 224-C, which sorts the same cards alphabetically. Note that display 224-B and display 224-C contemplate ten different cards corresponding to ten different data records 90. It is to be understood that any number of different cards and corresponding data records 90 can be maintained in device 54 subject to resource (i.e. memory and processor) constraints of device 54. Note that cards corresponding to data records 90 on display 224-B and display 224-C thus reflect the contents of universal wallet data file 78. Also note that while ten different cards are shown in display 224-B and display 224-C, only two card issuer data servers 86 are shown in FIG. 1, but it should be understood that more card issuer data servers 86 can be provided, one for each card corresponding to each data record 90. Device 54 is configured to return from display 224-C to display 224-B when the area of display 224-C that is indicated is depressed.

Figure 5:
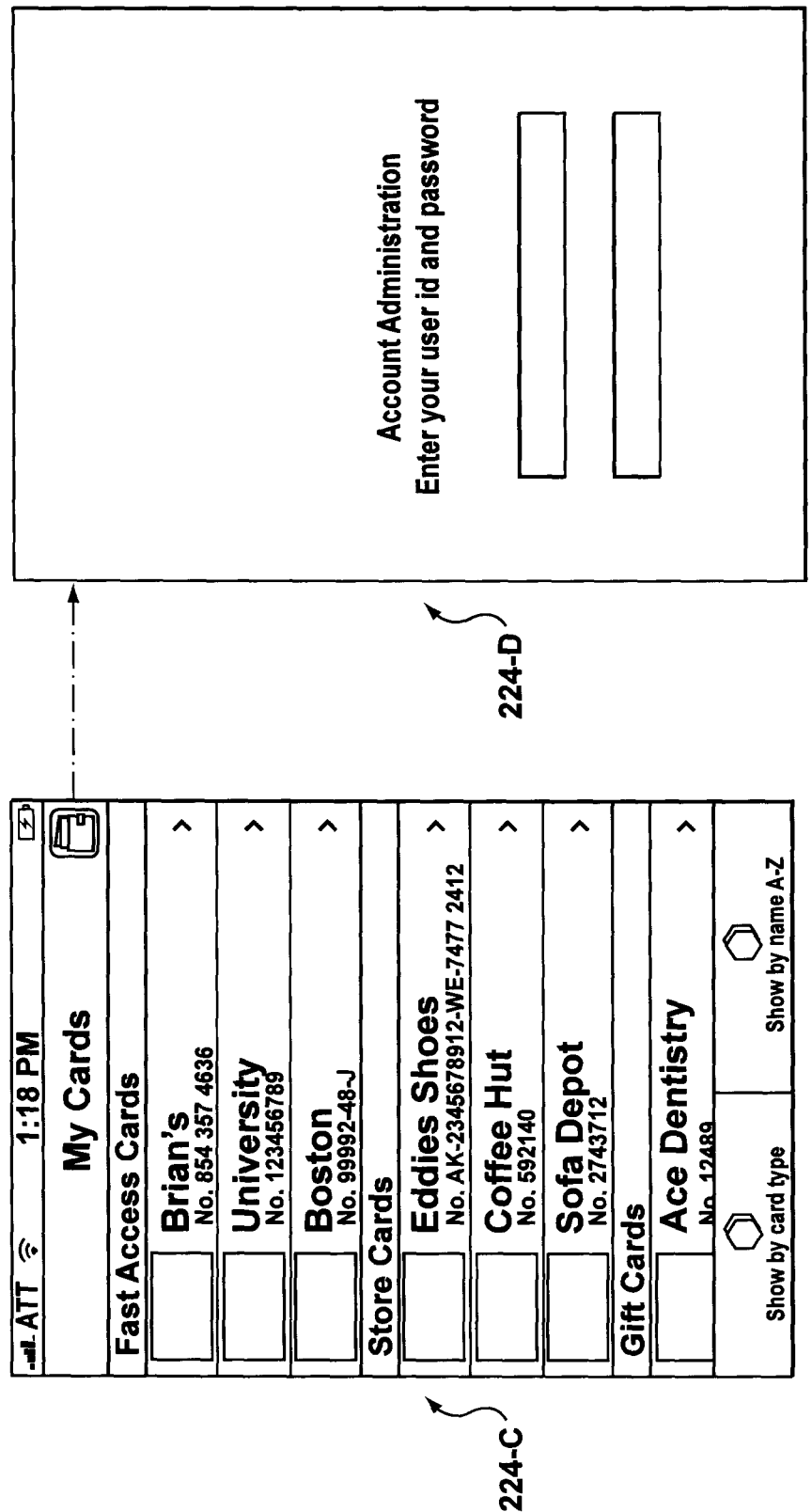
FIG. 5 shows exemplary screen shots from the electronic device of FIG. 1.

Referring now to FIG. 5, depressing touchscreen 202 in the indicated area of display 224-C will invoke display 224-D. Display 224-D shows a log-in screen for an administration tool that is hosted by central server 82 which can be used to administer the account on central server 82 that corresponds to device 54 and data file 78. Display 224-D and such account administration can also be invoked from the web-browser computer 102. Such administration can include updating identity information, address information, data records 90 and other administrative operations Referring now to FIG. 6, depressing touchscreen 202 in the indicated area of display 224-C will invoke display 224-E. Depressing touchscreen 202 in the indicated area of display 224-E will invoke display 224-F. Display 224-E and display 224-F show the contents of data record 90-1 corresponding to a first card. Data record 90-1 is of the URI Scheme Definition "LoyaltyCard://" In the present embodiment display 224-E shows the front of a virtual loyalty card issued by a pharmacy, whereas display 224-F shows the back of the same virtual loyalty card. Note that in the present embodiment the front and back of the virtual loyalty card is substantially an accurate facsimile of an actual loyalty card that is typically carried in a physical wallet.

Display 224-E, in addition to showing the front of the virtual loyalty card, also includes a machine readable indicia that can be read by reader 98.

Display 224-F, as part of the back of the virtual loyalty card, includes a facsimile of a bar code that would actually appear on the back of the virtual loyalty card, such a bar code being an additional machine readable indicia that can be read by reader 98. In addition to the back of the virtual loyalty card, display 224-F also includes a reproduction of the loyalty card number, the expiry date and a selectable area of touchscreen 202 entitled "Visit our web site" that can be selected to cause display 224 to shows a web-site hosted on the issuer server 86-1 corresponding to data record 90-1, such a web-site allowing administration of an individual account associated with data record 90-1.

Figure 7:
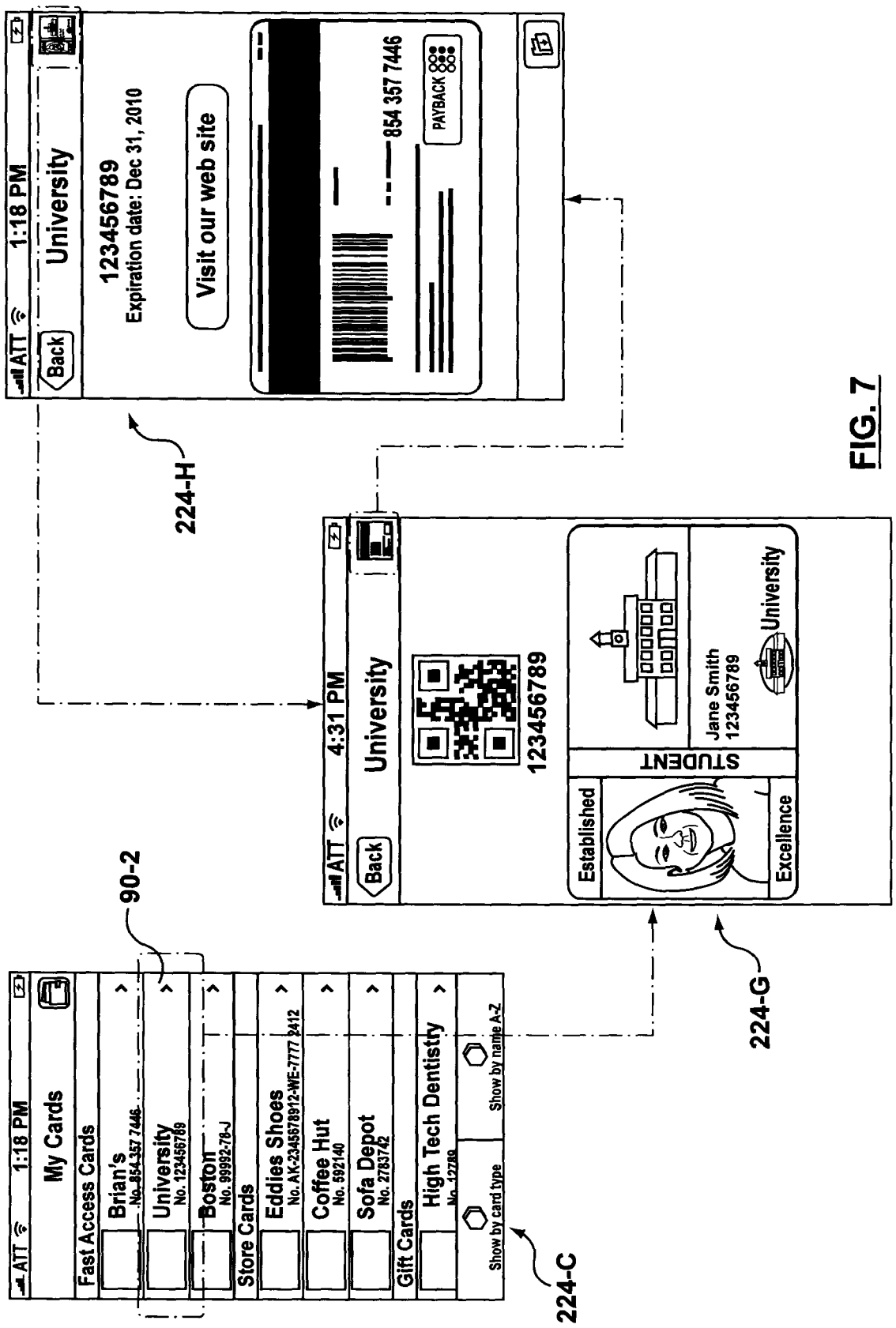
FIG. 7 shows exemplary screen shots from the electronic device of FIG. 1.

Referring now to FIG. 7, depressing touchscreen 202 in the indicated area of display 224-C will invoke display 224-G. (Note that this area in FIG. 7 is slightly different than the corresponding area in FIG. 5. This is for example purposes only—either area can be selected.) Depressing touchscreen 202 in the indicated area of display 224-G will invoke display 224-H. (Note that this area in FIG. 7 is slightly different than the corresponding area in FIG. 5. This is for example purposes only—either area can be selected.) Display 224-G and display 224-H show the contents of data record 90-2 corresponding to a second card. Data record 90-2 is of the URI Scheme Definition "IDCard://" In the present embodiment display 224-G shows the front of an identity card issued by a university, whereas display 224-H shows the back of the same university identity card. Note that in the present embodiment the front and back of the university identity card is substantially an accurate facsimile of an university identity card that is typically carried in a physical wallet.

Display 224-G, in addition to showing the front of the identity card, also includes a machine readable indicia that can be read by reader 98.

Display 224-H, as part of the back of the identity card, includes a facsimile of a bar code that would actually appear on the back of the identity card, such a bar code being an additional machine readable indicia that can be read by reader 98. In addition to the back of the identity card, display 224-F also includes a reproduction of the identity card number, the expiry date and a selectable area of touchscreen 202 entitled "Visit our web site" that can be selected to cause display 224 to shows a web-site hosted on the issuer server 86-2 corresponding to data record 90-2, such a web-site allowing administration of an individual account associated with data record 90-2.

Figure 8:
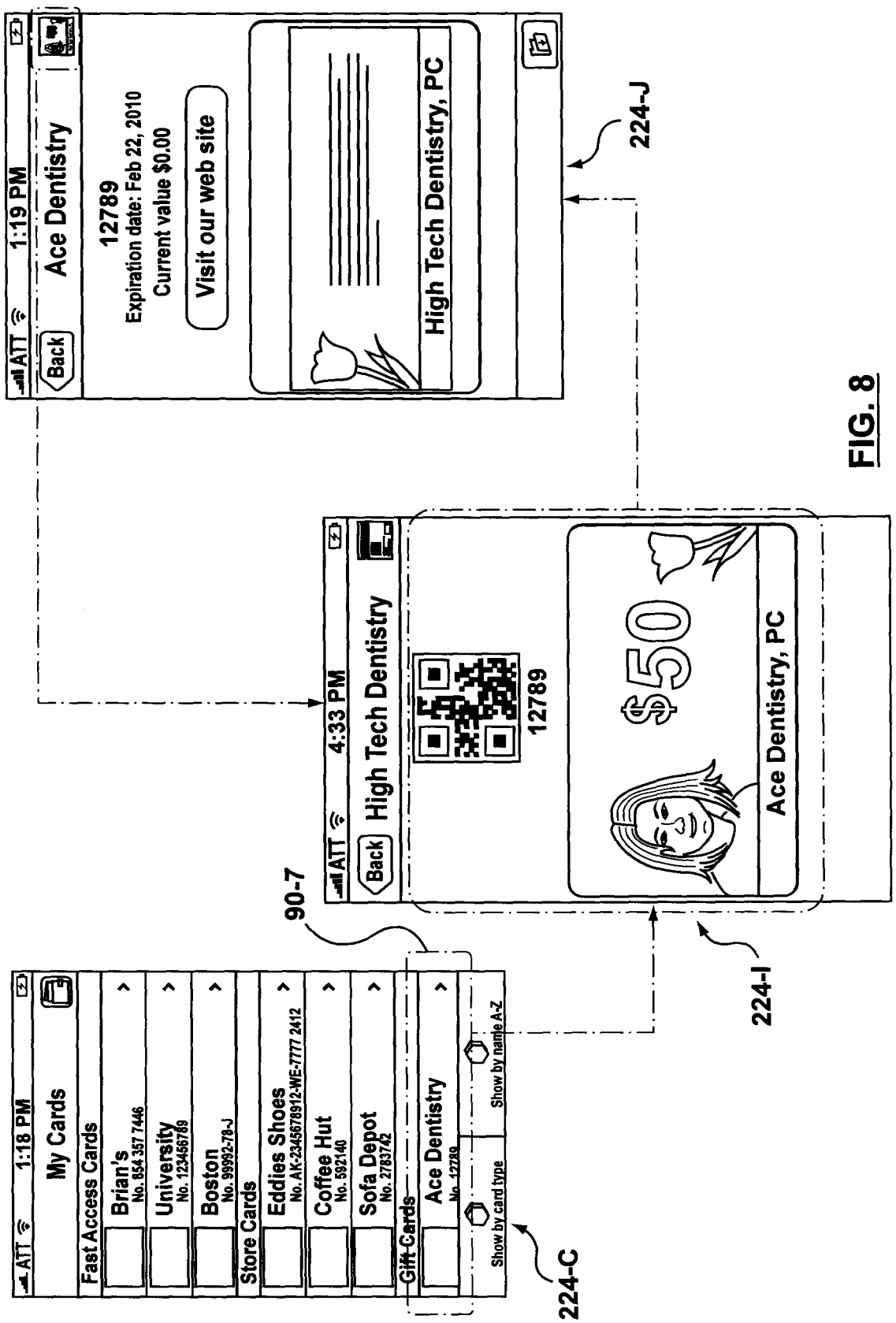
FIG. 8 shows exemplary screen shots from the electronic device of FIG. 1.

Referring now to FIG. 8, depressing touchscreen 202 in the indicated area of display 224-C will invoke display 224-I. Depressing touchscreen 202 in the indicated area of display 224-J will invoke display 224-I. Display 224-J and display 224-I show the contents of data record 90-7 corresponding to another card. Data record 90-7 is of the URI Scheme Definition "SVCard://" In the present embodiment display 224-I shows the front of a gift card issued by a dentist, whereas display 224-J shows the back of the same gift card. Note that in the present embodiment the front and back of the gift card is substantially an accurate facsimile of a gift card that is typically carried in a physical wallet.

Display 224-I, in addition to showing the front of the gift card, also includes a machine readable indicia that can be read by reader 98.

Display 224-J, as part of the back of the gift card, includes a legal disclaimers that actually appear on the back of the virtual loyalty card. In addition to the back of the gift card, display 224-J also includes a reproduction of the gift card number, the expiry date and a selectable area of touchscreen 202 entitled "Visit our web site" that can be selected to cause display 224 to shows a web-site hosted on the issuer server 86 corresponding to data record 90-7, such a web-site allowing administration of an individual account associated with data record 90-7. Display 224-J also shows the current remaining value on the gift card, shown as "Zero" on display 224-J.

Figure 9:
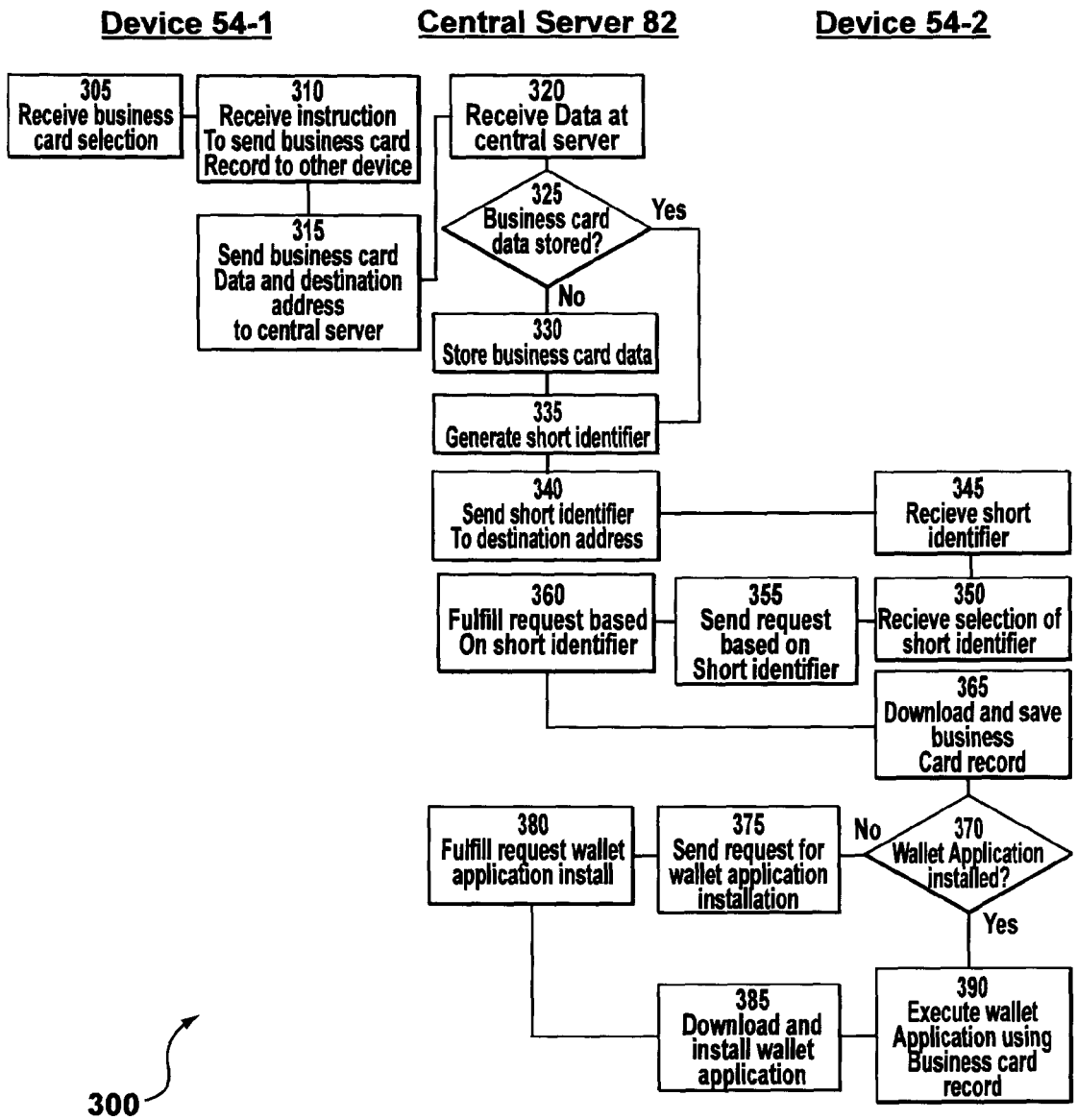
FIG. 9 shows a flowchart depicting a method of transferring an electronic artifact using the system of FIG. 1.

Referring now to FIG. 9, a method for transferring a business card record from one portable computing device to another portable computing device is depicting in the form of a flow-chart and indicated generally at 300. Method 300 can be explained using system 50, and in the context of device 54-1, central server 82 and device 54-2 but it will be understood that method 300 can be implemented on variations of system 50. In the following description, it will be assumed that device 54-1 has a business card data record 90 stored thereon, and that business card data record 90 is to be transferred to device 54-2.

At block 305, a selection of a business card record is received. In the present example, block 305 is performed by device 54-1. Block 305 can be effected in much the same manner as gift card record 90-7 was selected accord to FIG. 8, or the other examples in FIGS. 6 and 7. Such a selection is for a business card record conforming with a business card URI scheme, such as the scheme shown in FIG. 3, as stored in data file 78 of device 54-1.

At block 310, an instruction is received to send the selected business card record to another device. Block 310 can be effected by receipt of an instruction received via a touch screen 202, which indicates that the record selected at block 305 is to be sent to another device, the address of such a destination device being also received at block 310. The destination device address can be received in any form, but a typical example is the Mobile Subscriber Integrated Services Digital Network (ISDN) Number (MSISDN) or the actual telephone number associated with the destination device. A menu item can be provided as part of wallet application 74 that is generated on display 224 can be used to simplify the ease of provision of the instruction associated with block 310. In the present example, the instruction at block 310 indicates that the record is to be sent to device 54-2.

At block 315, the business card record selected at block 310 is sent to the central server. Block 315 is effected by device 54-1 transmitting business card record 90 to central server 82 via the infrastructure in system 50 of FIG. 1, or a suitable variation thereof.

At block 320, the business card record sent at block 315 is received at server 82. At block 325, a determination is made as to whether the business card record received at block 320 is already stored at central server 82 in the copy of data file 78 that is maintained at central server 82. If "no", then method 300 advances to block 330 and the business card record received at block 320 is stored in data file 78. If the determination at block 325 is "yes" then method 300 advances to directly block 335.

At block 335, a short identifier is generated. Such a short identifier is uniquely associated with the business card record received at block 320 and stored in the copy of data file 78 that is local to server 82. The short identifier can be in the form of a hyper text transfer protocol (HTTP) URI, of the exemplary form, "http:/centralserver82.com/businesscardrecord90". In the foregoing example, "centralserver82.com" represents the uniform resource locator (URL) for central server 82 on network 58, while "businesscardrecord90" identifies the business card record received at block 320 and stored at the copy of data file 78 that is locally maintained on central server 82.

At block 340, the short identifier generated at block 335 is sent to the destination device that was originally identified at block 310, such a destination address having been transmitted to server 82 at block 315. In a present embodiment, the short identifier is sent via short message service (SMS). In this manner, central server 82 need not have any understanding of the architecture or computing environment of the destination device 54-2. Thus, the composed SMS can include the following exemplary text: "You are being sent an electronic business card record. To retrieve this record, please select the following link from your mobile device browser: httpicentralserver82.com/businesscardrecord90". The SMS is sent via the infrastructure in FIG. 1, or a suitable variation thereof.

At block 345, the short identifier is received at the destination device 54-2. In the present embodiment, the SMS described at block 340 is received via an SMS application local to device 54-2.

At block 350, a selection of the short identifier is received. Block 350 typically comprises execution of the SMS application local to device 54-2 and generation of the SMS on display 224 of device 54-2. Block 350 further comprises the selection of the short identifier (i.e. http:/centralserver82.com/businesscardrecord90) via input entered through touch screen 202 or other pointing or input device on device 54-2, so as to invoke a browser application local to device 54-2 on the processor 208 of device 54-2. (In the event such a selection is not made, then method 300 terminates).

At block 355, a request is sent to the central server based on the short identifier selected at block 350. In the present example, the request is sent using the browser application native to device 54-2 via the infrastructure of FIG. 1 or a suitable variation.

At block 360, the request from block 355 is received at server 82 and fulfilled. In the present example, block 360 is effected by server 82 accessing the local copy of data file 78 to retrieve the business card record 90 received at block 320 and to send that business card record 90 to device 54-2. At block 365 the business card record sent at block 360 is downloaded and saved in a local copy of data file 78 at device 54-2. In the present example, the business card record 90 is sent in the form described above, namely in the form as follows:

"bizcard://v?c=John R. Smith&f=John&I=Smith&o=Tyco Toys Inc.&j=President and CEO&e=john.smith@tyco.com&r1=123 Main St.&r2=Suite 101&t=Newtown&s=PA&z=18935&y=USA&u=www.tyco.com&p1=2158452340&p2=267343 9087&n=We are tops in toys".

At block 370 a determination is made as to whether the wallet application is installed. If the determination is "no" then at block 375 a request is sent to download and install the wallet application 74 locally on device 54-2. At block 380 the request from block 375 is received and fulfilled at server 82 by sending a file that can be used to install application 74 on device 54-2. At block 385 the wallet application is downloaded onto device 54-2 and installed locally thereon. At block 390 (which can be reached directly from block 370 if a "yes" determination is made at block 370), the wallet application is executed using the business card record downloaded at block 365. At this point device 54-2 is able to generate screens in the type shown in FIGS. 4-8.

(As variation of method 300, and an alternative to an automatic determination at block 370, method 300 can be varied to eliminate block 370 such that it is presumed that wallet application is already installed, or providing an alternative flow so that user input can be received requesting download and installation of the wallet application). Graphical images associated with the downloaded card are downloaded separately, such that when input is received to access a particular card in the wallet application, then a web service call is made dynamically (right now to a free Google web service) to get the generated image associated accessed business card.

It should be understood that each device 54 can be manufactured by different entities and can have varying infrastructures, in which case the exact structure of application 74 and file 78 for each device 54 can vary according to those infrastructures. Therefore, it will be noted that the fulfilling of the download request at block 380 can include sending the version of application 74 that is configured specifically to the unique infrastructure of the device 54 requesting download and installation of that application.

Figure 10:
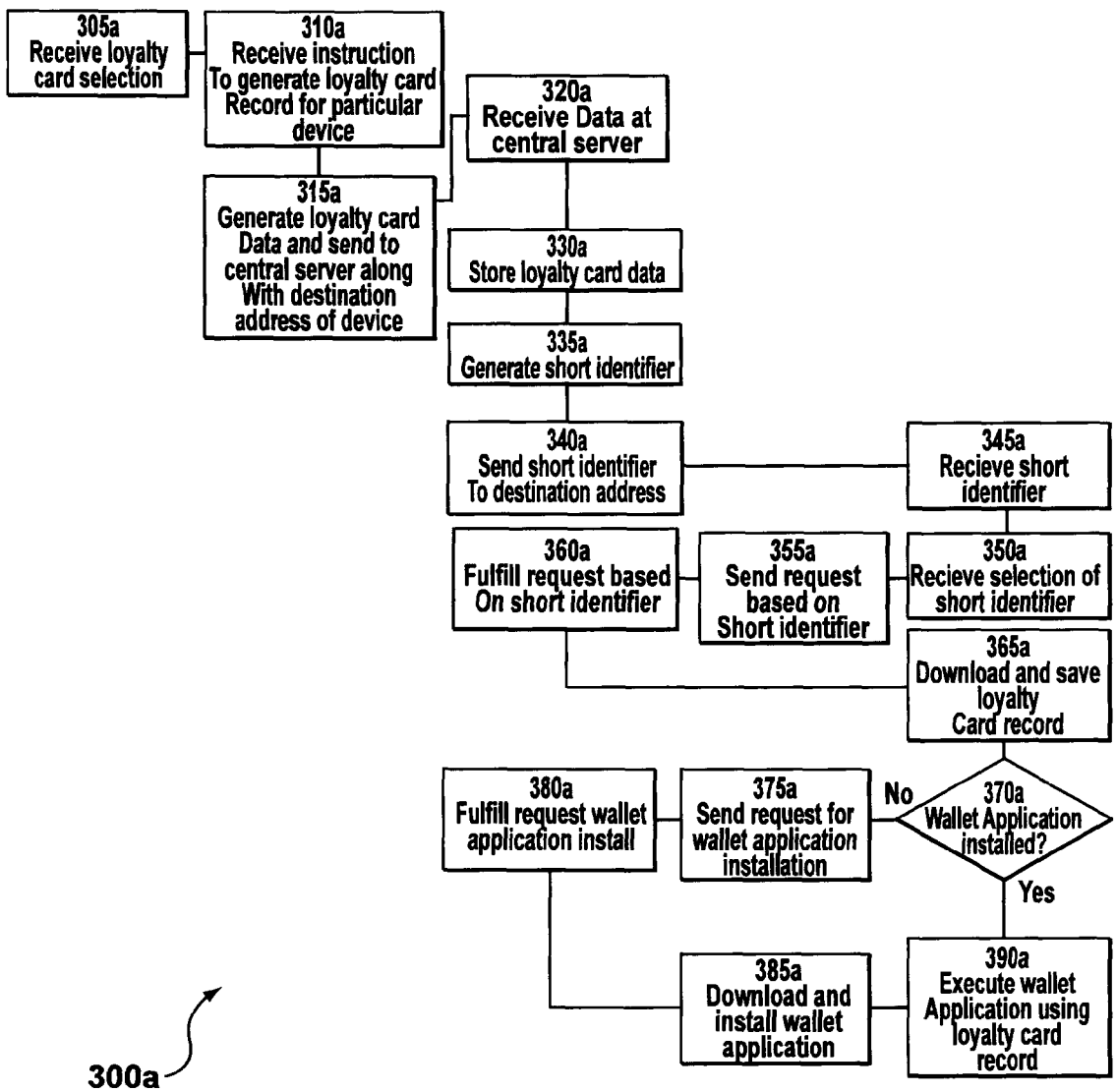
FIG. 10 shows a flowchart depicting another method of transferring an electronic artifact.

Those skilled in the art will now recognize that method 300 can be varied in order to send other types of data records 90 to devices 54. FIG. 10 shows such an example of a variation of method 300, in the form of method 300a. In method 300a, like blocks to method 300 are shown with the same reference, except followed by the suffix "a". Of note is that method 300a pertains to the generation and sending of a loyalty card data record 90 to a device 54, and thus method 300a arises in the context of generation of a loyalty card. In method 300a, it is assumed that reader server 94-1 is associated with a point of sale of an enterprise that utilizes loyalty cards, and that device 54-2 is proximal to that reader server 94-1 but that device 54-2 has no loyalty card record associated with that enterprise, but that a request is being made to generate such a loyalty card record 90 so that such a loyalty card record can be generated and stored locally on device 54-2. It is also assumed that issuer server 86-1 is associated with the enterprise and is configured to generated loyalty card records 90 respective to that enterprise.

In the specific example of FIG. 10, method 300a, blocks 305a and 310a involve receiving a request to generate loyalty card record 90-1 at reader server 94-1 which is sent to issuer server 86-1. Block 305a can include all particulars that are needed to generate the loyalty card record, including destination MSISDN, a name and/or address to be included in the loyalty card record and the like.

At block 315a, issuer server 86-1 receives the request generated at block 310a and in response generates loyalty card record 90-1 and forwards that data to central server 82. The generation of the loyalty card record 90-1 can include incorporation of the particulars received at block 305a, as well as a specific loyalty card number for that record 90.

Figure 6:
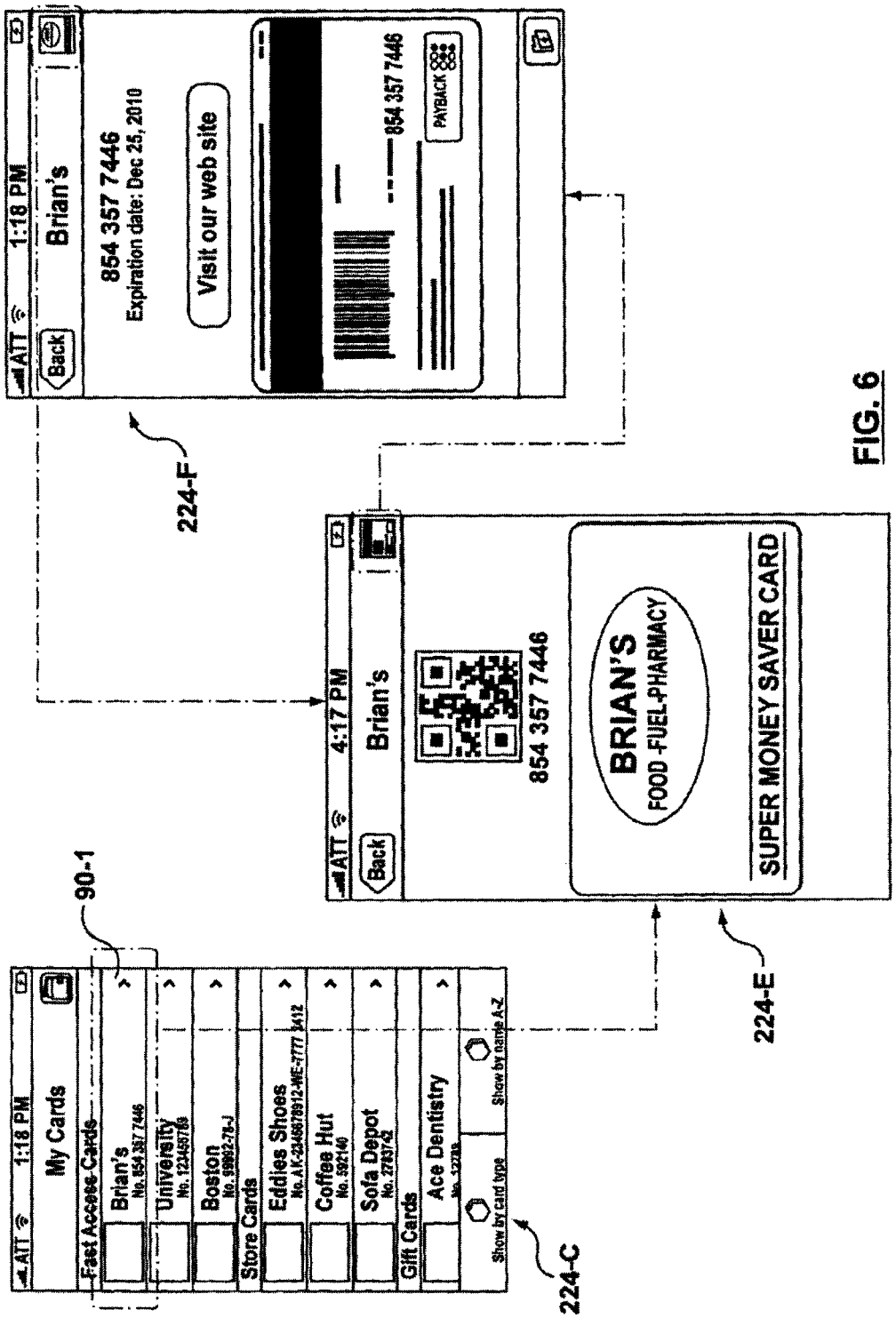
FIG. 6 shows exemplary screen shots from the electronic device of FIG. 1.

At block 315a, the loyalty card data and the destination MSISDN is sent to the central server 82, where it is received at block 320a. At block 330a the loyalty card data is stored in the central server local version of data file 78. The remainder of method 300a is effected in substantially the same manner as the corresponding blocks in method 300. Advantageously, the entire performance of method 300a can be performed within minutes, or even less than a minute, such that when block 390a is reached the loyalty card record 90 can be generated on display 224, in much the same manner as shown in FIG. 6, such that the reader 98-1 can be used to read the machine readable indicia from record 90 as discussed above.

Those skilled in the art will now appreciate that other URI scheme definitions from Table I can also be deployed using suitable modifications of method 300 or method 300a.

It is to be understood that variations, sub-sets and combinations of the foregoing are contemplated, and that the scope of the exclusive privilege of this specification is defined by the claims.

The invention claimed is:

1. A method of transferring a data record to a portable electronic device comprising:
   receiving a send request at a central server from an originating portable electronic device to send said data record to a destination portable electronic device; said data record maintained according to one of a plurality of uniform resource identifier (URI) scheme definitions; each of said URI scheme definitions configured to generate a different type of wallet artifact in a wallet application at said destination portable electronic device; said send request including a destination address for said destination portable electronic device;
   storing said data record at said central server;
   generating a short identifier corresponding to said data record at said central server;
   sending said short identifier from said central server to said destination portable electronic device using said destination address; said short identifier configured to be accessible at said destination portable electronic device to cause said destination portable electronic device to request said data record from said central server; and
   receiving an administration request for updating said data record at said central server from said destination portable electronic device.

2. The method of claim 1 wherein said plurality of URI scheme definitions comprise data representations of one or more of: a virtual business card; a user-created representation of an identity card; a loyalty card; an identification card; a gift card; a prepaid card; a coupon; a credential to permit access to an event; a sales receipt; a ticket to an entertainment event; and a public transit system pass.

3. The method of claim 1 wherein said one of a plurality of URI scheme definitions corresponds to a loyalty card and wherein said originating portable electronic device is associated with an issuer server; said method further comprising initially sending said send request from said originating portable electronic device to said issuer server; said issuer server configured to generate said data record.

4. The method of claim 1 wherein said one of a plurality of URI scheme definitions corresponds to a business card and wherein said originating portable electronic device is configured to generate said data record.

5. The method of claim 1 further comprising omitting said storing step if said data record is already stored at said central server.

6. The method of claim 1 further comprising sending an installation file comprising said wallet application to said destination portable electronic device for installation on said destination portable electronic device.

7. The method of claim 1 wherein said short identifier is sent via short message service.

8. The method of claim 1 wherein said short identifier is a hyper text transfer protocol (HTTP) identifier.

9. The method of claim 1 wherein said data record comprises data accessible by said wallet application; said wallet application configured to generate a machine readable indicia on a display of said destination portable electronic device; said machine readable indicia corresponding to said data.

10. The method of claim 1 further comprising generating output based on said data record at said destination portable electronic device, said output configured to be read by a proximity reader.

11. A method of transferring a data record to a destination portable electronic device comprising:
    receiving a short identifier at said destination portable electronic device from a central server in response to a send request from an originating portable electronic device; said data record corresponding to one of a plurality of uniform resource identifier (URI) scheme definitions; each of said URI scheme definitions configured to generate a different type of wallet artifact in a wallet application at said destination portable electronic device;
    receiving a selection of said short identifier via an input device at said destination portable electronic device;
    sending a data record request for said data record from said destination portable electronic device to said central server; said data record request for said data record based on said short identifier;
    receiving said data record at said destination portable electronic device in response to said data record request for said data record;
    storing said data record at said destination portable electronic device; and
    generating a representation of said data record on a display of said destination portable electronic device;
    sending an administration request for updating said data record from said destination portable electronic device to said central server.

12. The method of claim 11 wherein said short identifier is sent via short message service.

13. The method of claim 11 wherein said short identifier is a hyper text transfer protocol (HTTP) identifier.

14. A method of claim 11 further comprising determining if said wallet application is installed on said destination portable electronic device and if not installed, sending an application request from said destination portable electronic device to said central server to receive an installation file containing said wallet application.

15. The method of claim 11 further comprising generating output based on said data record at said destination portable electronic device, said output configured to be read by a proximity reader.

* * * * *